US009585185B1

(12) United States Patent
Sapkota et al.

(10) Patent No.: US 9,585,185 B1
(45) Date of Patent: Feb. 28, 2017

(54) METHODS AND SYSTEMS TO FACILITATE CONFERENCING USING MOBILE DEVICE (71) Applicant: SHORETEL, INC., Sunnyvale, CA (US)

(72) Inventors: Bhawani Sapkota, Fremont, CA (US); Timothy S. Olson, San Jose, CA (US)

(73) Assignee: Shoretel, Inc., Sunnyvale, CA (US)

( * ) Notice: Subject to any disclaimer, the term of this patent is extended or adjusted under 35 U.S.C. 154(b) by 277 days.

(21) Appl. No.: 14/307,035

(22) Filed: Jun. 17, 2014

(51) Int. Cl.
H04W 92/02 (2009.01)
H04W 76/02 (2009.01)

(52) U.S. Cl.
CPC ................ H04W 76/025 (2013.01)

(58) Field of Classification Search
None
See application file for complete search history.

(56) References Cited

U.S. PATENT DOCUMENTS

| 6,967,672 | B1 | 11/2005 | Huber et al. |
| 7,894,805 | B2 | 2/2011 | Joglekar |
| 7,894,806 | B2 | 2/2011 | Leigh et al. |
| 8,112,071 | B2 | 2/2012 | Joglekar |
| 8,249,571 | B2 | 8/2012 | Jacobstein et al. |
| 8,487,975 | B2 | 7/2013 | King et al. |
| 8,600,027 | B1 | 12/2013 | Doerr et al. |
| 2005/0227680 | A1 | 10/2005 | Snowden |
| 2009/0104891 | A1* | 4/2009 | Shu ............ H04L 12/2898 455/411 |
| 2010/0009674 | A1* | 1/2010 | Sapkota ............ H04W 36/36 455/426.1 |
| 2013/0143539 | A1 | 6/2013 | Baccay et al. |
| 2013/0152153 | A1* | 6/2013 | Weiser ............ H04L 63/0236 726/1 |
| 2014/0179275 | A1* | 6/2014 | Goguen ............ H04L 63/0407 455/411 |
| 2014/0323085 | A1* | 10/2014 | Wu ............ H04L 63/083 455/411 |

FOREIGN PATENT DOCUMENTS

EP 1469663 A1 10/2004

* cited by examiner

Primary Examiner — Vladimir Magloire
Assistant Examiner — Frank Donado
(74) Attorney, Agent, or Firm — Tarolli, Sundheim, Covell & Tummino LLP (57) ABSTRACT A non-transitory computer-readable medium can include instructions for performing a method that includes, in response to an activation user input at a mobile device associated with a teleconference event, automatically joining the mobile device to the teleconference event. The mobile device can join the teleconference event by retrieving stored call-in details for the teleconference event, and sending, from the mobile device to a remote proxy, the call-in details for the teleconference event. The method can also include connecting the mobile device to the teleconference event via a call path that is established in response to the sending.

22 Claims, 7 Drawing Sheets

METHODS AND SYSTEMS TO FACILITATE CONFERENCING USING MOBILE DEVICE

TECHNICAL FIELD

This disclosure relates to methods and systems to facilitate conferencing using a mobile device.

BACKGROUND

A teleconference can be implemented via two or more persons using a variety of media types, such as via one or more audio, video, and/or data services by one or more means (e.g., telephone, computer, telegraph, teletypewriter, radio, and television). Teleconferences provide convenient way to conduct meetings while reducing travel costs and allowing workers to be more productive by not having to go out-of-office for meetings. Participants of a conference call are usually able to call into the conference call themselves by dialing a telephone number that connects to a conference bridge (a specialized type of equipment that links telephone lines). The conference bridge can be controlled by a participant's company or third party service provider who maintains the conference bridge. In order to connect, each participant typically dials a phone number and enters a conference identifier and a PIN code (e.g., password) to access the conference call.

SUMMARY

This disclosure relates to methods and systems to facilitate conferencing using a mobile device.

As one example, one or more non-transitory computer-readable media can have instructions to perform a method. The method can include in response to an activation user input at a mobile device associated with a teleconference event, automatically joining the mobile device to the teleconference event. The mobile device can join the teleconference event by retrieving stored call-in details for the teleconference event, and sending, from the mobile device to a remote proxy, the call-in details for the teleconference event. The method can also include connecting the mobile device to the teleconference event via a call path that is established in response to the sending.

As another example, a system can include a mobile device configured to send teleconference information for a given teleconference event to a remote proxy in response to a user input at the mobile device to join the given teleconference event. The teleconference information can include call-in details sufficient to enable the remote proxy to connect to a teleconference resource for the given teleconference event. The mobile device further can connect to the remote proxy to establish a call leg between the mobile device and the remote proxy. The remote proxy can be configured to establish a call leg between the remote proxy and the teleconference resource in response to the teleconference information. The remote proxy can also be configured to join the mobile device into the given teleconference event of the teleconference resource by bridging the call leg between the mobile device and the remote proxy with the call leg between the remote proxy and the teleconference resource.

As yet another example, a method can include, in response to a user input at a mobile device activating a user interface associated with a given teleconference event, establishing a communications path between the mobile device and a proxy device that is remote with respect to the mobile device. A communications path between the proxy device and a predefined teleconference resource can be established based on call-in details for the given teleconference event provided from the mobile device to the proxy device via a data channel in the absence of another user input. The communications path between the mobile device and the proxy device can be bridged with the communications path between the proxy device and the predefined teleconference resource to enable the mobile device to join the given teleconference event.

DETAILED DESCRIPTION

This disclosure relates to methods and system to enable a mobile device to easily join a teleconference. The teleconference can enable multiparty communications by providing one or more of audio, video, and/or data services. The mobile device (e.g., a cellular telephone, tablet computer or the like) includes an application or function programmed to facilitate joining a teleconference, such as in response to a user input activating a user interface (e.g., a touch screen input, a voice command or the like) associated with the teleconference. For example, the user interface can be generated based on parsing calendar data to detect a scheduled teleconference. Call-in details (e.g., conference access number, access code and password) for the teleconference can also be extracted from the calendar data based on such parsing and stored in memory. In response to the user input activating the user interface, the mobile device can send the call-in details for the teleconference to a remote proxy. For example, the remote proxy can be a remote server (e.g., in an enterprise or cloud) to which the mobile device has been authenticated. The remote proxy can be configured to employ the call-in details to connect to the teleconference. Once connected, the remote proxy can operate to bridge the connection between the mobile device and the teleconference.

In some examples, the mobile device can be configured to select one of a plurality of different paths for establishing the call for the teleconference. For instance, the different paths can be different types of communication networks, such as Wi-Fi, cellular data and cellular voice. The mobile device can send the call-in details to the remote proxy in a message that can vary depending on which path is selected. The remote proxy, in turn, can be programmed to control how it handles bridging the connection between the mobile device and the teleconference based on the communication from the mobile device. In this way, connection between the mobile device and the teleconference can be facilitated, for example, in response to a single user input.

Figure 1:
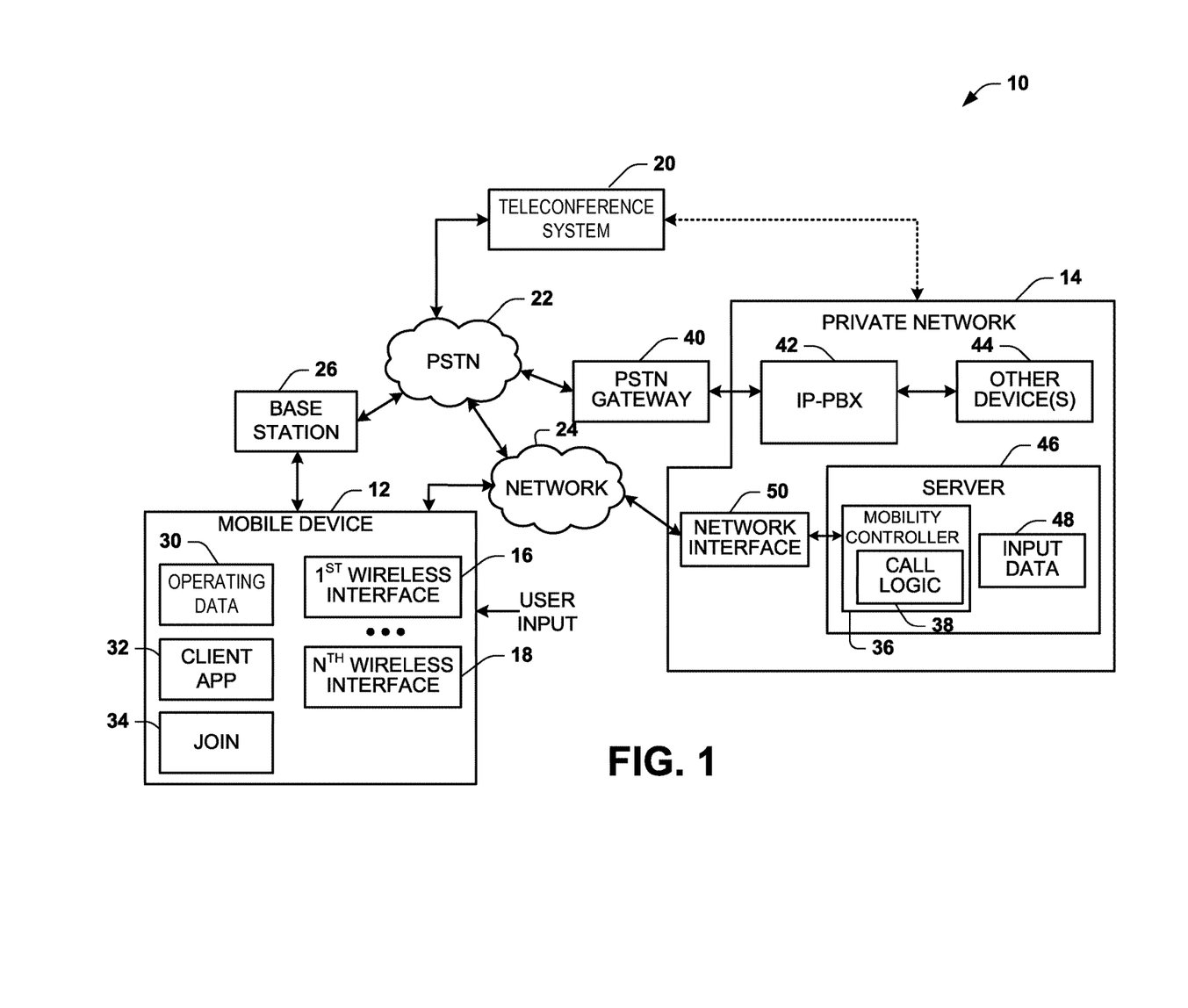
FIG. 1 depicts an example of a communications system.

FIG. 1 depicts an example of a communications system 10 that includes a mobile device 12 and private network 14. The mobile device 12 and private network 14 are configured to facilitate joining a teleconference from the mobile device. The mobile device 12 can be any portable multi function device, such as a cellular telephone, smart phone, personal digital assistant (PDA), tablet computer, notebook computer or the like. In the example of FIG. 1, the mobile device includes one or more N wireless interfaces 16 and 18, where N is a positive integer denoting the number of wireless interfaces. Each of the wireless interfaces 16 and 18 can communicate through a respective network 22 or 24 according to an established communication protocol. In some examples where N is greater than or equal to two, the mobile device 12 can implement a plurality of radio technologies one or more of which can be employed to join a teleconference. In other examples, the mobile device 12 can be configured to operate using a single radio technology.

As used herein, the term "radio technology" and variations of this term are intended to encompass any form of wireless communication that may be utilized to send, to receive or to send and receive audio signals (including voice signals), data signals or a combination of voice and data signals without requiring a hard-wired or other physical connection. Examples of different radio technologies include cellular telephones (e.g., 2G, 3G or 4G Global System for Mobile (GSM) technologies), personal communication system (PCS) communication technologies, wireless networks, (e.g., wireless local area networks (WLAN), such as Wi-Fi; wireless metropolitan area networks (WirelessMAN), such as WiMax; and any variation and improvements thereof), satellites, Bluetooth, two-way (or half-duplex) radio, and any combinations thereof. Those skilled in the art will understand and appreciate that various standards and protocols exist and have yet to be developed to enable communication via these and other radio technologies.

By way of example where the wireless interface 16 is a cellular interface, the interface can be registered to communicate with a base station 26 via a cellular radio technology. The base station 26 is connected to a public switched telephone network (PSTN) 22 for communicating voice data and/or other media data. Another of the wireless interfaces 18 can be configured to communicate via a Wi-Fi or WiMax radio technology through another network 24, such as an internet protocol network. The mobile device 12 thus can employ one or more of the wireless interfaces 16 and 18 to join and maintain a teleconference session in the system 10, which may be hosted by a teleconference system 20, utilizing one or more radio technologies.

The mobile device 12 includes a client application 32 configured to facilitate joining a teleconference in response to a user input. The client application 32, for example, can be programmed to parse calendar data to detect one or more scheduled teleconference event and to extract pertinent call-in details for the scheduled teleconference event. The call-in details can include information sufficient to enable the user to connect to the teleconference. For example, the call-in details can include an access telephone number for the teleconference and an access code for the teleconference event. In some examples, the call-in details can include a password (e.g., personal identifier number (PIN)) to identify the participant. For example, in some situations, the caller may be a host that has a separate identifier to enable additional functionality during the teleconference. The particular set of call-in details extracted for a given teleconference event can vary according to the teleconference system in which the teleconference event is to be held. The client application can be programmed to detect and extract such call-in details for any number of different teleconference systems.

The client application 32 can be programmed to generate an ordered list of scheduled events, including teleconferences, based on the parsing of calendar data. For each teleconference event, the client application 32 can also generate a join user interface 34 programmed to initiate a join process in response to a user input entered at the mobile device 12. The user interface 34, for example, can be implemented as a button or a link associated with a given teleconference event that can be activated (in response to the user input) to execute the join process associated with the given teleconference event. The client application 32 can be programmed to provide other PBX related features at the mobile device. The client application can be registered for operation with the private network 14 to enable such functionality by providing cooperation with a mobility controller 36, such as can execute as part of the private network (e.g., resident at the private network and/or in a cloud) 14.

By way of example, the join process of the client application 32 can initiate a communication session for connecting to the teleconference event. The join process can be implemented based on the extracted call-in details, which are stored in memory for the event, and current operating parameter data. Where more than one wireless interface 16-18 is available for placing a call, the join process can include determining which one or more wireless interfaces to employ for connecting the teleconference event. For instance, the client application 32 can use one or more of the wireless interfaces during the join process, which can be based on applying call connection logic to the current operating parameter data. The current operating parameter data can include the availability of a link via each wireless interface 16 and 18, location of the mobile device 12, user preferences and the like. For example, if the client application 32 decides to make the call over Wi-Fi or cellular data, the call can be placed as a voice over internet protocol (VoIP) call using a data channel of one of the interfaces 16 or 18. In other situations, the call can be placed as a cellular voice call via a cellular interface (e.g., the interface 16). Additionally or alternatively, the join process associated with the client application 32 can selectively enable one or more capabilities (e.g., audio, video, desktop sharing or the like) to utilize in a given teleconference based on the current operating parameter data.

As mentioned, the mobile device 12 (as well as any number of other mobile and fixed devices) can be registered for operation within the private network 14, such as via the mobility controller 36. The mobility controller 36 can include call logic 38 that can be accessed by the client application 32 to implement at least a portion of the functionality to connect the mobile device 12 with the teleconference event at the teleconference system 20, such as in response to call-in details for the teleconference event provided by the client application 32 to the mobility controller 36. As an example, the client application 32 of the mobile device 12 can provide the call-in details (or at least a portion thereof) to the call logic 38 in response to the user input to initiate the join process. For instance, the client application 32 can employ a data channel (e.g., using a signaling communications protocol, such as the Session Initiation Protocol (SIP)) via one of the wireless interfaces 16 or 18 to send the call-in details to the proxy device in the absence of another user input.

The call logic 38 of the mobility control 36 can be configured to connect to the teleconference system 20, such as by operating a proxy on behalf of the client application 32 of the mobile device 12 that initiated the join process. For instance, the call logic 38 can establish a call leg from the private network to an access number of the teleconference system that was provided in the call-in details from the client application 32. The call logic 38 can further provide other credentials, such as an access code and/or password, to access the designated teleconference resource of the telephone conference system 20. Once the call leg has been established by the call logic 38 between the mobility control 36 and the designated teleconference resource, the mobility control can bridge the call between mobile device 12 and the designated teleconference resource to enable a user (or users) of the mobile device to conduct the teleconference. The communication session for the teleconference can be conducted through which ever of the wireless interfaces 16 or 18 was selected when the call was initiated.

Additionally, the teleconference could be handed off between the different interfaces 16 or 18 of the mobile device 12. For example, the mobility control of the server 46 can control substantially seamless roaming and handover of a call leg from an established anchor point between different radio technologies employed by the mobile device 12. For example, if a cellular call from the mobile device has been anchored in the private network 14 (e.g., via the IP-PBX 42), the server 46 can cause the IP-PBX 42 to transfer an anchor point for the call to a new call leg that has been established between the private network 14 and the mobile device over a different radio technology (e.g., Wi-Fi or WiMAX). The client application of the mobile device 12 and mobility control 36 of the server 46 can cooperate to perform such handover, for example, depending on changes in call conditions during the teleconference and/or in response to a user input.

As an example, the mobile device 12 can be configured to perform handover between different wireless radio technologies, such as disclosed in U.S. Pat. No. 8,140,079, entitled SYSTEM AND METHOD TO FACILITATE HANDOVER, which is incorporated herein by reference. Other methods to control handover between different radio technologies can also be implemented by the mobile device and/or the private network.

In the example of FIG. 1, the private network 14 is also coupled to the PSTN 22, such as via a gateway (e.g., a PSTN gateway) 40 that is configured to provide an interface between the private network 14 and the public network. For instance, the private network 14 can include an IP-PBX 42 in communication with the gateway 40, such as via a plurality of telephone lines or an ISDN interface (e.g., PRI/BRI). The IP-PBX 42 can provide a variety of PBX functionality as well as communication using an IP protocol, including VoIP for devices residing in or anchored in the private network 14. One or more other device 44 can also be connected to the IP PBX, such as a VoIP telephony that is capable of communicating with the IP PBX 164 using an IP protocol. In some examples, the private network 14 can include a teleconference system 20 connected to the IP-PBX 42 configured to bridge multiple call legs to provide a corresponding teleconference. That is, while the teleconference system 20 is demonstrated as external to the private network 14, the private network can itself include a locally hosted or a cloud-based conference bridge. In the example where private network 14 includes such a conference bridge, the mobility control 36 can establish a call leg to the conference bridge directly or via the IP-PBX 42, which can be connected to the mobile device 12 to bridge the call between the mobile device and such teleconference.

The server 46 of the private network 14 further can be programmed to control communication for devices and processes operating within the private network. In addition to the mobility control 36 described above, the server 46 can include one or more other application components and input data 48 to implement a variety of other communication functions, such as can vary according to application requirements and the availability of resources to perform the intended functions. The input data can include information received from the mobile device 12 (e.g., call-in details) or other devices 44 operating in the private network.

As a further example, certain types of the input data (e.g., location information, rate plan information, failure of PBX equipment, manual control) can be stored as operating data 30 in memory at the mobile device 12 and as input data 48 of the private network 14 prior to the outbound call is initiated at the mobile unit 152. Other types of information (e.g., call-in details, mobile device ID, control information) can be generated and stored as part a communication session, such in response to the user initiating the join process for a given teleconference event from the mobile device 12.

As a further example, the private network 14 can also include any number of one or more network interfaces 50 configured to connect with the network 24. The network interface 50 can provide access to an internal network or an external network (e.g, the Internet) using an IP protocol. It is to be understood that the various blocks and functions disclosed in the mobile device 12 and the private network 14 in the example system 10 can be implemented as software (e.g., stored on one or more non-transitory media), hardware (e.g., a processor, switch or controller executing instructions), or as a combination of software and hardware.

Figure 2:
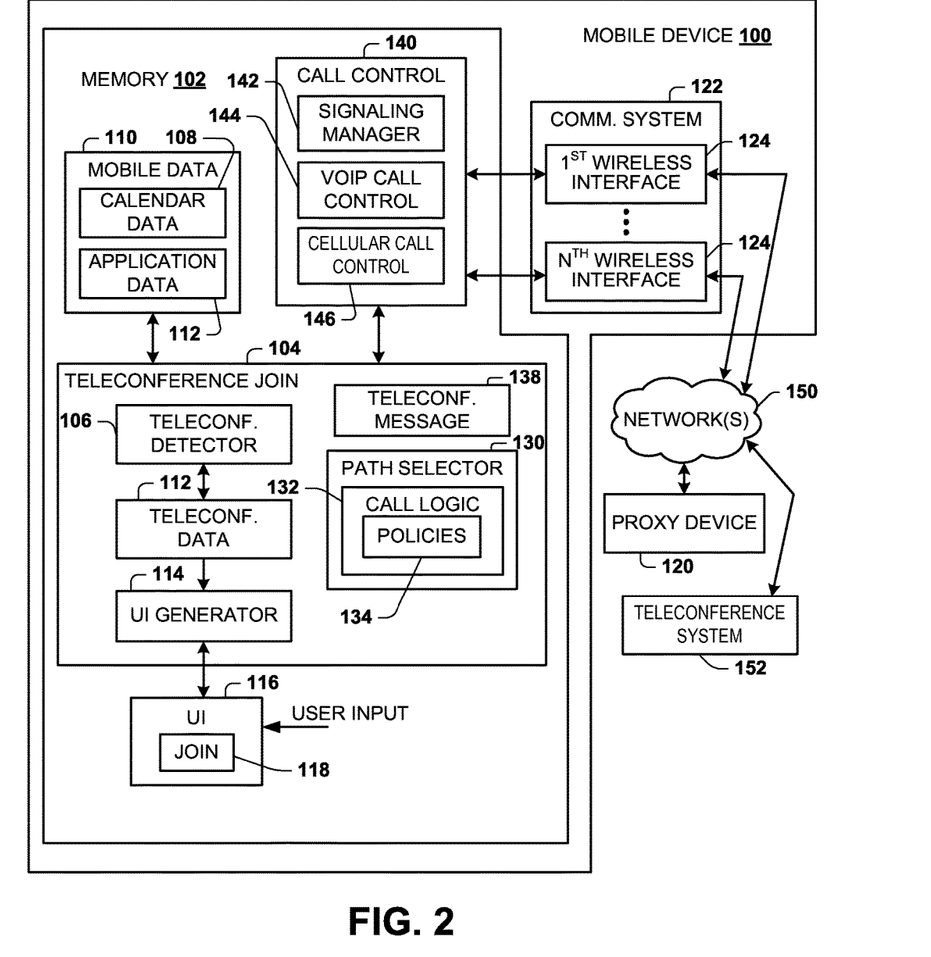
FIG. 2 depicts an example of a mobile device that can be configured to join a teleconference.

FIG. 2 depicts an example of a mobile device 100 configured to facilitate joining a teleconference such as disclosed herein. The mobile device 100 includes executable instructions stored in memory 102. The executable instructions can be accessed from the memory 102 by a processor (e.g., including one or more processor cores) and executed to perform various functions. The memory 102 may include one or more non-transitory computer readable storage media, such as volatile memory (e.g., random access memory) as well as non-volatile memory (e.g., magnetic disc storage, flash memory, solid state memory or the like). For example, the memory 102 can also include an operating system, call control as well as one or more other applications, which may be resident in the memory for performing the basic functions of the mobile device 100. The memory 102 can also store data that is used by the executed methods and functions. Some applications further may be installed by a user such as downloaded from a remote location (e.g., a server or another computer).

In the example of FIG. 2, the memory 102 includes teleconference join function 104 to facilitate joining teleconferences at the mobile device 100. The teleconference join function 104 includes a teleconference detector 106 configured to detect one or more teleconference events based on analyzing calendar data 108 that is stored as part of the mobile data 110 in the memory 102. The mobile data 110 can also include application data 112 that includes other executable instructions that can be implemented by the mobile device 100 for other purposes associated with operation of the mobile device.

In the example of FIG. 2, it is presumed that the mobile device 100 is a smart phone type of device capable of executing third party software in addition to implementing communication functions for the mobile device. The teleconference detector 106 thus can generate teleconference data based on parsing the calendar data 108. The calendar data 108 can include events scheduled in a calendar function at the mobile device 100 and/or may be synchronized with one or more other calendar databases (e.g., Microsoft Outlook, Google Calendar and the like) such as maintained at a remote server. The teleconference data can include an arrangement of scheduled events, including teleconference events, meetings or other calendar entries. As used herein, a teleconference event refers to a scheduled event that includes data specifying call-in details required for accessing a teleconference in a communication session. The communication session for a teleconference event can include audio, video and/or other media (e.g., instant messaging, shared desktop or the like).

A UI generator 114 can be configured to generate a user interface element 116 for each teleconference event based on the calendar data 108 analyzed by the teleconference detector 106. The UI generator 114, for example, can generate the user interface 116 to include a join GUI 118 associated with respective teleconference event. The join GUI 118 for a given teleconference event thus can be activated in response to a user input to initiate a join process for the given teleconference event at the mobile device 100. For instance, the join GUI 118 can provide a point of single user interaction for joining the teleconference event. In this way, a user of the mobile device can activate the GUI element 118 (e.g., via a single user input, such as clicking or voice command) and join the teleconference without having to enter manually typical access numbers, participant codes, passwords and the like. Instead, as disclosed herein, the teleconference join function 104 is configured to provide the call-in details to a remote proxy device 120. The proxy device 120 is programmed to complete requisite dialing and enter of the call-in credentials sufficient to connect to the teleconference event and, in turn, automatically connect the mobile device with the teleconference.

In the example of FIG. 2, the mobile device 100 includes a communication system 122 that includes one or more wireless interfaces 124 demonstrated as a $1^{st}$ through $P^{TH}$ wireless interfaces, where P is a positive integer. Each of the wireless interfaces 124 can employ a different radio technology and implement one or more protocols for communicating voice and/or other data. Thus, in some examples, the communication system 122 for the mobile device 100 can be considered a multi-mode communication device, such as can initiate a telephone call as a VoIP call or a cellular call using one or more of the wireless interfaces 124.

Each of the wireless interfaces 124 can be connected to an appropriate network 150 via a corresponding communication link, which can be a wireless link or a physical link (e.g., an electrically conductive or optical fiber link). In the example of FIG. 2, the network 150 can include a combination of PSTN and IP networks that collectively can be utilized for conducting a communication session between the mobile device 100 and the proxy device 120 as well as between the mobile device and the teleconference system 152. For instance, the teleconference system 152 can be configured to implement an IP teleconference session using an IP protocol and/or it can implement a circuit switched call session over the PSTN.

As a further example, the teleconference join function 104 can include a path selector 130 is configured to determine a call path for a given teleconference event. For example, the path selector 130 can be programmed to select to make the call for a given teleconference event as a cellular call or a VoIP call. As a further example, the path selector 130 can employ call logic 132 to determine the corresponding call path for the teleconference event based on policies 134 and corresponding mobile data 110. For instance, the policies 134 can specify which type of call to use based on one or more parameters specified by the mobile data. The mobile data 110 thus can specify the availability of various wireless networks, current signal strength, location and/or movement of the mobile device 100 or other information stored in or derived from the mobile data 110. Other software and/or hardware operating within the mobile device 100 or remotely (e.g., the proxy device 120) can populate the mobile data 110 to include the information sufficient to enable the path selector 130 to determine which call path to utilize. In some examples, user preferences (e.g., stored in mobile data 110) can be used to set which call path is to be used for joining a teleconference.

Based on the selected call path and the teleconference data for a given teleconference event, which has been activated in response to a user input, the teleconference join function 104 can generate a teleconference message 138. The teleconference message 138 can be a predefined message format (e.g., a packet) that includes text specifies the call-in details for the given teleconference event. As an example, the call-in details can include a conference access number and one or both of an access code and password. The teleconference message 138 can be stored in the memory 102.

As part of the join process, the teleconference join function 104 can employ corresponding call control 140 of the mobile device 100 to provide the teleconference message 138 to the proxy device 120. The call control 140 is configured to set up and control communication sessions via the communication system 122. For example, the call control 140 can include a signaling manager 142 that is configured to implement signaling, such as by implementing the Session Initiation Protocol (SIP). Other signaling communication protocols can also be utilized by the call control 140. The call control 140 can also include a VoIP call control 144 and a cellular call control 146 for controlling VoIP and cellular communication sessions, respectively. For example, the VoIP call control 144 can control the communication session that has been established as a WIFI VoIP call via one of the wireless interfaces 124 or a cellular data VoIP call via another of the wireless interfaces. In other examples, if the path selector 130 selects a cellular voice path for joining the teleconference, the call control 140 can employ the cellular call control 146 for controlling the communication session via the cellular wireless interface 124.

As mentioned, prior to establishing the communication session for a given teleconference event, the join process can employ the signaling manager 142 for providing the teleconference message 138 to the proxy device 120. The signaling manager 142 can send the teleconference message 138 to the proxy device via a data path. The data path can include data communications over Wi-Fi or cellular data, for example. The type of signaling implemented by the signaling manager 142 for sending the call-in details to the proxy device 120 can vary depending upon the selected path. In some examples, the signaling manager 142 can provide the call-in details of the teleconference message 138 to the proxy device 120 as part of a SIP INVITE request sent to the proxy device via a SIP protocol (e.g., via Wi-Fi or cellular data). In other examples, the signaling manager 142 can provide a SIP NOTIFY message (via cellular data) to the proxy device 120 that includes the teleconference message, such as where the path selector 130 has selected a cellular voice path for the teleconference call.

The proxy device 120 is configured to connect to the teleconference system 152 in response to the teleconference message 138 provided to the proxy device when the teleconference join function has been initiated in response to a user input. Again, the proxy device 120 can implement the call on behalf of the mobile device based on the call-in details according to the type of path (e.g., VoIP call or cellular call path) that is selected by the path selector 130. The proxy device 120 can determine the type of path by explicit data provided in the teleconference message or based on the type of signaling used to send the call-in details to the proxy device. After the proxy device 120 has established a call leg between the proxy device and the teleconference system 152 for a given teleconference event session, the proxy device 120 can bridge the teleconference call leg with a corresponding mobile device call leg such that one or more uses of the mobile device can participate in the teleconference.

Figure 3:
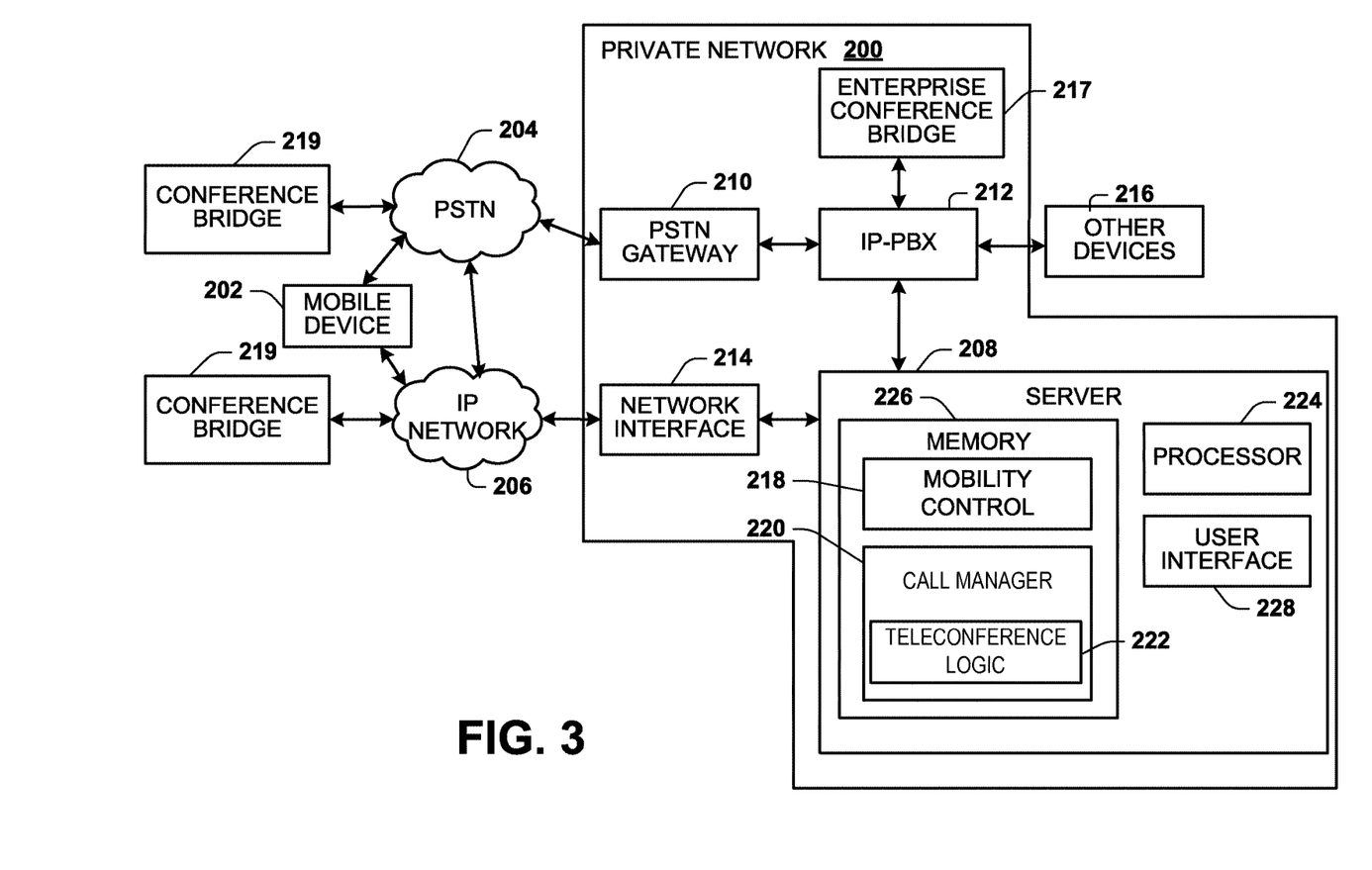
FIG. 3 depicts an example of a private network configured to facilitate joining a teleconference using a mobile device.

FIG. 3 depicts an example of a private network 200 that is configured to enable a mobile device 202 (e.g., corresponding to device 100 of FIG. 2), which is authenticated for operation in the private network, to join a teleconference. The private network 200 can correspond to any network that is located and/or operates outside of a public service provider network for the mobile unit. For example, the mobile device 202 can subscribe to a mobile service plan for operation over a Public Land Mobile Network (PLMN). The private network 200 can be enterprise network (e.g., for an organization or business entity), an independent VoIP operator (e.g., a VoIP service provider, such as Vonage or the like) or a personal network (e.g., a home-based network). While the description of FIG. 3, for purposes of example, describes the private network 200 as corresponding to an enterprise, it will be appreciated that similar functionality can be implemented other types of private networks.

Any number of one or more mobile devices 202 can be authenticated with the private network 200 such that data communication between each mobile device and the private network can be enabled over one or more networks, schematically indicated as PSTN 204 and IP network 206. For example, the mobile device 202 can support one or more wireless data communication protocol (e.g., GPRS, EDGE, EDGE Evolution, LTE, Wi-Fi, Bluetooth and the like) that can be utilized to connect to a server 208 within the enterprise 200 via the IP network 206. As disclosed herein, the data communication can be leveraged by the mobile device 202 to provide call data, including teleconference call-in information relating to the outbound communication for joining a teleconference, from the mobile device to the enterprise 200. The data communication can also be utilized to provide control information from the enterprise 200 to the mobile device 202 to bridge the communication session between the mobile device and a teleconference. This communication of call-in details can occur prior to the private network 200, which operates as a proxy for the mobile device, initiates the call to the teleconference access number. From the perspective of the user of the mobile device 202, the communication of the call-in details from the mobile device can be implemented as part of a background control process hidden from the user or it can be demonstrated as an automated part of the join process.

The private network 200 also includes a PSTN gateway 210 that is in communication with the PSTN 204, such as through a corresponding interface. For example, the gateway 210 can be in the form of a local loop that includes a plurality of telephone lines or an ISDN service, such as PRI/BRI, for providing a link between the enterprise and the PSTN gateway 210 for placing and receiving calls over the network 204. It is to be understood that the network 204 can represent the PSTN as well as one or more public land mobile network (PLMN) that are in communication with the PSTN.

An IP-PBX 212 is connected with the PSTN gateway 210 and the server 208. The IP PBX 212 can define a node in the private network 200. The IP-PBX 212 is programmed to performing switching functions, such as establishing, maintaining, modifying and disconnecting connections between legs of a communications session. The PBX 212 can connect with another node in the enterprise (e.g., the PSTN gateway 210), the server 208 or one or more other devices 216 using an IP protocol. While the PSTN gateway 210 is illustrated within the private network, it will be understood that the PSTN gateway may reside external to the private network 200. In the example of FIG. 3, the private network 200 (corresponding to an enterprise communications system) can include a conference bridge 217. There can be any number of one or more external conference bridges 219 that provide teleconference resources available to the general public or privately within other enterprise networks. The systems and methods disclosed herein can be employed to access teleconference resources for teleconference events regardless of their location. Additionally, the other device(s) 216 may include one or more of a voice over IP (VoIP) telephony device (such as an IP telephone, IP fax machine, multi-media computer, media terminal adapter, analog terminal adapter, or other device or service) that is capable of communicating with the IP PBX 212 using an IP protocol.

Examples of signaling communications protocols that can be utilized for a communication session through the PBX 212 can include H.323, session initiation protocol (SIP), which are standard VoIP signaling protocols. Using SIP, for instance, the mobile device 202 (or other authenticated device) could send an IP-based SIP "INVITE" message to the IP PBX 212, in an effort to set up a call from the mobile device to another resource (e.g., conference bridge 217) that may reside in the private network 200 or conference bridge 219 external to the private network (e.g., via the PSTN gateway 210). The IP PBX 212 can also process and connect calls originating within the enterprise 200 to the called parties within the private network as well as parties residing external to the enterprise via the PSTN gateway 210 or via a network interface 214. While the IP-PBX 212 and the PSTN gateway 210 are illustrated separate components, they may be integrated within the enterprise 200.

In the example of FIG. 3, the server 208 includes a mobility control application 218 to control mobility functions for mobile devices 202 that are authenticated with the enterprise 200. In the example of FIG. 3, the mobility control application 218 resides in memory 226 of the server 208. In other examples, some or all of the mobility control application 218 could be implemented in a computing cloud or be distributed between the network and a cloud. The mobility control application 218 is configured to control mobility functions (e.g., call routing and accessing other enterprise resources 208, 216, 217) for each mobile device authenticated for operation with the private network.

As described herein, the mobile device 202 can authenticate with the mobility control application 218 of the private network via a background process over a data network supported by the mobile device. The mobility control application 218 can include a call manager function 220 programmed to manage calls and other communication requests received from each authenticated mobile device 202. For example, the call manager function 220 can implement one or more signaling communications protocols (e.g., SIP or as otherwise indicated herein) to set up, modify and terminate call legs of a communications session. As disclosed herein, such communication session can be initiated at a mobile device 202 to join a teleconference event.

As an example, the mobile device 202 can employ signaling over a data channel to send teleconference call-in data for a given teleconference to the call manager 220 of the mobility control application 218 running in the server 208. For example, as part of the process to join the teleconference via a cellular communications session, the mobile device 202 can implement a cellular call to a predefined enterprise number to access the mobility control application 218 running in the server 208. In other examples, the mobile device 202 can implement a VoIP call (e.g., via a cellular data or Wi-Fi channel) to access the mobility control application 218 running in the server 208 as part of the join process for a teleconference event. The path utilized for placing the call from the mobile device 202 can be selected by the device, for example, such as disclosed herein.

As a further example, the call manager 220 can include teleconference logic 222 programmed to access and join a given teleconference event based on the call-in details received from the mobile device 202. For example, the teleconference logic 222 can employ the call manager to establish a call leg to connect with a teleconference resource at a specified teleconference access number. The call leg can include an audio channel, a video channel, and/or one or more other media channels, which can depend on the type of teleconference event and the capabilities of the mobile device 202.

As a further example, the teleconference logic 222 can be programmed to automatically determine which capabilities to enable for a given teleconference in response to activation of the user interface (e.g., join UI element 118 of FIG. 2) at the mobile device 202. As mentioned, the capabilities can include one or more type of media communication to utilize for the given teleconference. The teleconference logic can select one or more types of communication capabilities to utilize based on operating parameter data, which can be provided in the call-in details received from the mobile device 202 and/or derived based on the call-in details. For example, the operating parameters can include one or more of the following: type of mobile device (e.g., model number or other descriptor) 202, physical location of the mobile device, type of network connection for the mobile device, network capacity for the mobile device, movement data (e.g., is the mobile device moving or stationary), user preferences specifying which type(s) of communication capability(ies) to employ for the teleconference. User preferences can set for all teleconferences or may be set for each respective teleconference in response to a user input (e.g., prior to or in conjunction with initiating the join process). In some examples, the decision as to the type communication capability to employ in a given call can be determined solely by the mobile device and provided in the call-in details. In other examples, the determination as to the type communication capability to employ in a given call can be made by the teleconference logic 222 based on the operating parameter data provided in the call-in details. In yet another example, the determination as to the type communication capability to employ in a given call can be distributed among the join process executed by the mobile device 202 and the teleconference logic 222 at the private network 200. The teleconference logic 222 can provide the requisite data to the conference bridge to set the communication capabilities for the mobile device, which can be sent via DTMF, for example.

After detecting that the call leg has been connected to the teleconference, the teleconference logic 222 can provide the participant or other access code for the respective teleconference event based on the call-in details received from the mobile device 202. If needed, the teleconference logic 222 can provide an additional password or other credentials needed to completely log on to the teleconference. The call manager 220 can then bridge the call leg between the mobility control 218 and the teleconference with the call leg (or legs) to the mobile device to thereby connect the mobile device with the teleconference. The user can then proceed with the teleconference in a normal manner.

As demonstrated in FIG. 3 for additional context, the server 208 can also include a processor 224 that is programmed and configured to control operation of the server 208 based upon executable instructions stored in associated memory 226. The memory 226 can include random access memory (RAM), read only memory (ROM), flash memory, or any other type or a combination of memory devices. The processor 224 can communicate through the IP PBX via signaling using a control protocol (e.g. SIP, SCCP or H.323). The processor 224 can also retrieve and store data and instructions to and from the memory 226. Alternatively or additionally, the processor 224 may include cache or access other associated memory (not shown) directly for performing the functions described herein as well as for performing and controlling other functionality. The server 208 can also include a user interface component 228 that can be utilized to program the mobility control 218 and its related components 220 and 222, such as by an administrator or other authorized user.

The mobility control 218, for example, can also be programmed to control handover for a mobile device 202 from one radio technology to another different radio technology provided that the mobile device is anchored in the private network. For instance, handover can be initiated in a manner disclosed in the above-incorporated U.S. Pat. No. 8,140,079 or by other known or yet to be developed techniques.

Figure 4:
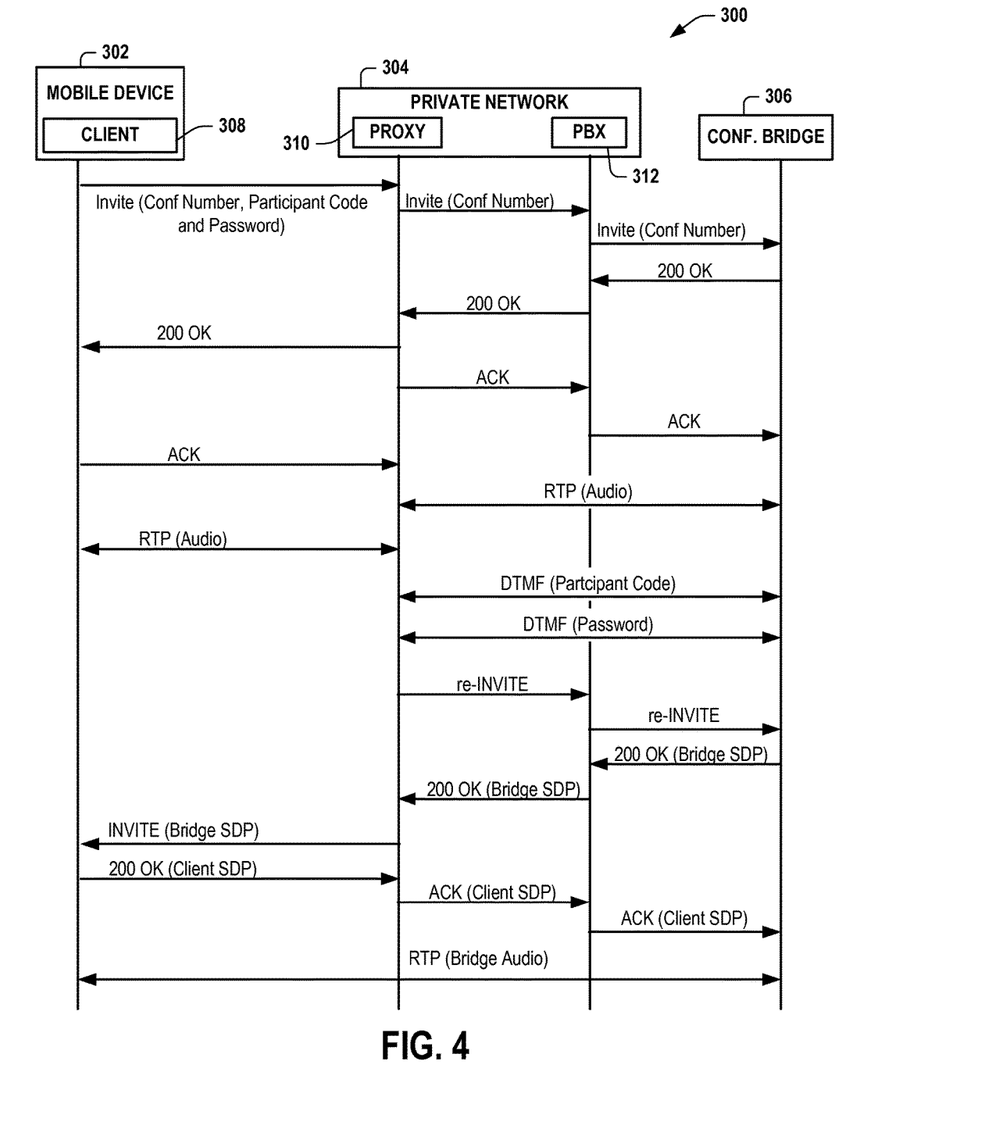
FIG. 4 depicts is a signaling diagram demonstrating an example of joining a teleconference from a mobile device using a voice over internet protocol.
Figure 5A:
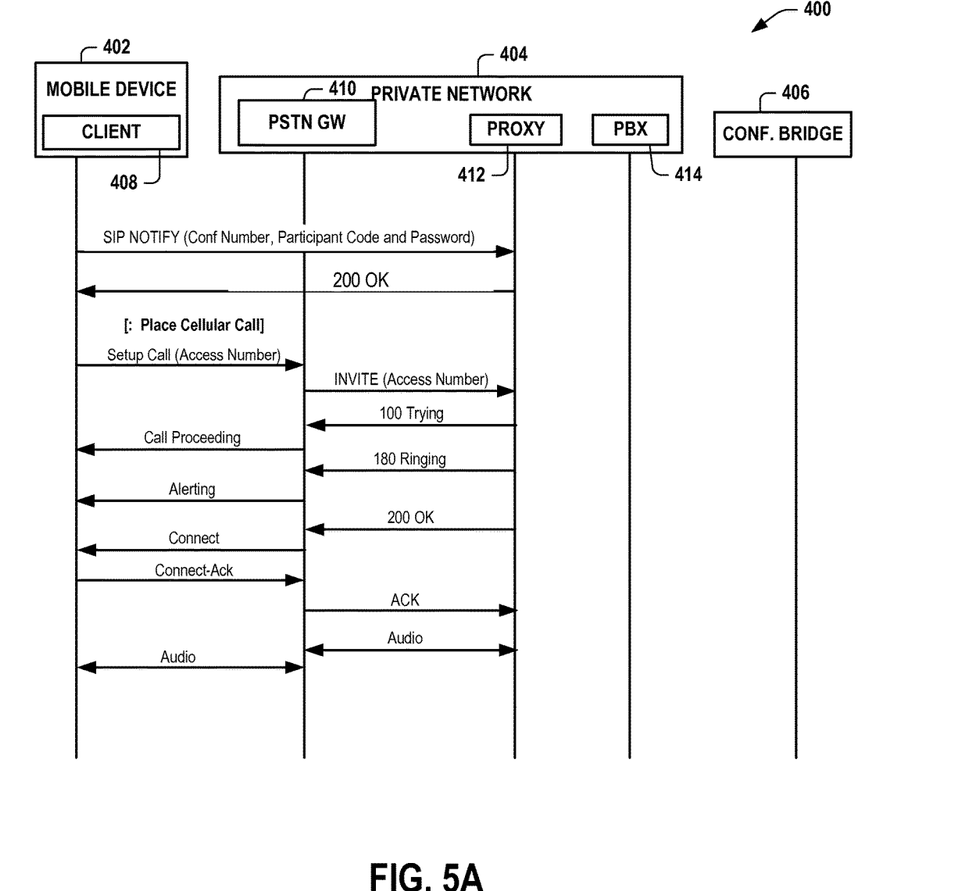
FIGS. 5A and 5B depict a signaling diagram demonstrating an example of signaling for a mobile device joining a teleconference using a cellular call.
Figure 5B:
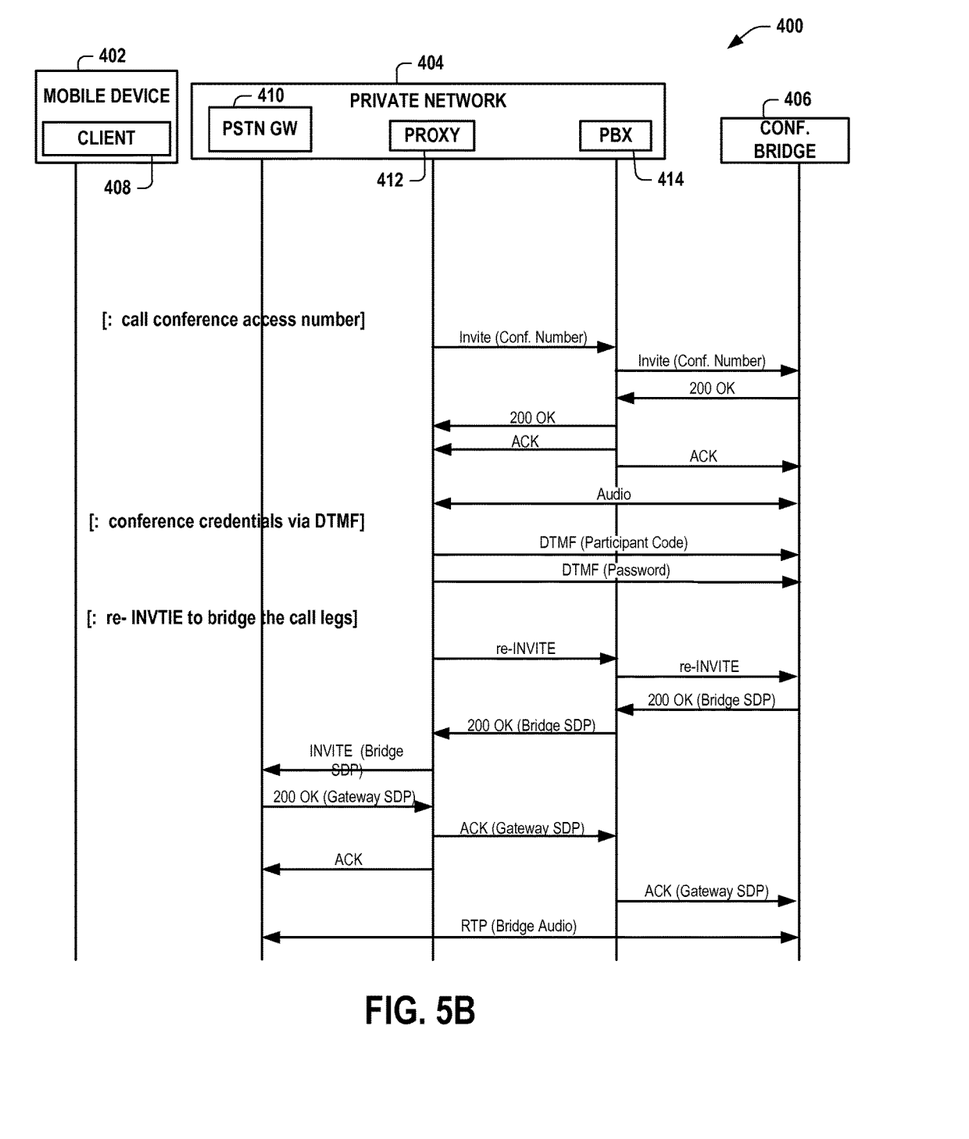

In view of the structural and functional features described above, certain methods will be better appreciated with reference to signaling diagrams of FIGS. 4 and 5. For sake of consistency, the same reference numbers refer to the same parts in the various examples of FIGS. 4 and 5. In these examples, physical actions or operations performed by a user are demonstrated by arrows originating from a user block, such as the user input being performed with respect to a mobile device 302. It is to be understood and appreciated that the illustrated signaling, in other examples, may occur in different orders or concurrently with other actions. Additionally, not all features and signaling illustrated in FIG. 4 or 5 may be required to join a teleconference. That is, the examples of signaling provided in each of FIGS. 4 and 5 are but examples of types of signaling that could be used.

FIG. 4 depicts an example of a signaling diagram 300 for a communication system that includes a mobile device (e.g., corresponding to device 100 of FIG. 2) 302, a private network (e.g., corresponding to network 200 of FIG. 3) 304 and a conference bridge 306. The mobile device 302 can include a client application 308 that can be programmed to facilitate joining a teleconference, such as disclosed herein. The private network 304 can include a mobility controller that operates as a proxy 310 for the mobile device 302 as part of the join process. The private network can also include a PBX 312 for accessing a conference bridge which may be local or external relative to the private network 304.

In the example of FIG. 4, the signaling diagram 300 demonstrates joining a teleconference via a VoIP call initiated at the mobile device 302. As disclosed herein, the mobile client 308 can be programmed to select a corresponding call path such as whether to initiate the call as a VoIP call or a cellular call. In other examples, additional types of calls (e.g., video conferencing and other forms of media) can also be utilized and selected by the appropriate path selector to enable the communication session to be conducted between the mobile device and the conference bridge.

In response to a user input at the mobile device 302 (e.g., activating a join user interface element), the mobile device can provide an invite request to the proxy of the private network. The invite request can include a predetermined message format that includes the conference number, participation code, and password information sufficient for conducting the teleconference. The proxy (e.g., teleconference logic, mobility controller of the enterprise network, e.g., as disclose with respect to FIG. 3) can store the call-in details in memory for use in connecting to a given teleconference event at the conference bridge 306. In response to the invite request from the mobile device, the proxy 310 can issue an invite to the conference number specified in the teleconference message received from the mobile device. The invite can be provided to the PBX 312 which can in turn send the corresponding invite to the conference bridge 306 per the specified conference number.

In this example, signaling status messages can be exchanged to confirm receipt of the invite request, including a 200 OK that can be passed from the conference bridge 306 to the PBX 312, to the proxy 310 and in turn to the client 308 to respond to the respective invite requests. Each response message can be responded to by an acknowledgment message. The invite request and other messages can include call session information for each call leg, such as between the conference bridge and the private network as well as between the proxy and the client of the mobile device 302. Additionally, audio and/or video can be communicated (e.g., using the Real-time Transport Protocol (RTP)) over the call leg between the proxy 310 and the conference bridge as well as between the proxy 310 and the mobile client 308. For example, the RTP audio between the client 308 and the proxy 310 can provide comfort noise so that Dual Tone Multi-Frequency (DTMF) codes and/or other signaling that might occur during the join process are substantially inaudible to the user(s) at the mobile device 302.

As mentioned, the proxy 310 can provide corresponding credentials for the teleconference to the conference bridge, such as in the form of DTMF codes based on the call-in data received from the mobile device 302. In response to the appropriate codes (e.g., a participant access code and/or password) being provided from the proxy to the conference bridge via the RTP audio channel, the proxy can issue a re-invite request to the conference bridge 306 via the PBX 312, which can be provided via Session Description Protocol (SDP) to provide parameters to enable connecting the mobile device 302 with the conference bridge 306. The conference bridge 306 can confirm the re-invite providing an SDP message to the proxy 310. The proxy 310 can also issue an invite with the corresponding SDP information back to the mobile device 302. The mobile device 302 can respond (with a 200 OK message) with a corresponding client SDP information that can in turn be provided to the conference bridge 306 via the PBX 312.

The proxy 310 can also acknowledge the SDP information from the client 308 and the proxy 310 can bridge the call leg between the client device 302 and the conference bridge 306. For example, the communication session between the mobile client 308 and the conference bridge 306 can be an audible only message in which RTP audio is communicated based upon the session parameters established between the conference bridge and the mobile client 308. In other examples, one or more other types of media (e.g., video, remote collaboration, such as desktop sharing or the like) can also be provided according to communication session parameters agreed upon between the mobile device 302 and the conference bridge 306.

FIG. 5 depicts a signaling diagram 400 for establishing a teleconference communication session between a mobile device 402 and a conference bridge 306. Thus, the communication system includes one or more mobile devices 402, a private network 404, and conference bridge 406. The mobile device 402 includes a client application (e.g., mobility client application of FIG. 2) that is authenticated for operation within the private network 404. The private network 404 includes a PSTN gateway 410, a proxy 412, such as corresponding to a mobility controller to which the client application 408 of the mobile device 402 has been authenticated, and a PBX 414. In the example of FIG. 5, the signaling diagram 400 demonstrates an example of signaling that can be implemented for establishing the communication session for a teleconference event as a cellular conference call from the mobile device.

As demonstrated in FIG. 5, in response to user input received at the mobile device for initiating the join process for a given teleconference event, the client application 408 sends the conference call-in details via data channel to the proxy 412. This can be sent to the proxy in response to the join process being initiated at the mobile device or at other times (e.g., periodically or when conference data is generated). For example, the client 408 can provide the call-in details sufficient for conducting the teleconference event as part of a SIP notify message having a predetermined format for the proxy 412. In response to the notify message, the proxy 412 can respond with a '200 OK' response acknowledging receipt of such information. The call-in details can be stored in memory of the proxy 412, such as corresponding to the server in the private network 404. Subsequent to transmission of the call-in data, the mobile device can place a cellular call to a predetermined enterprise number associated with the private network 404. For example, the telephone call to the access number for the enterprise can proceed in a normal manner.

For example, the private network can receive the call via the PSTN at the PSTN gateway 410 which can in turn provide a corresponding invite to the access number associated with the proxy 412. The call control associated with the proxy 412 can respond with a '100 trying' response that can in turn be provided via the PSTN gateway and PSTN call control initiated with the mobile device 402. The progression of the signaling can continue, such as including a '180 ringing' request to the PSTN gateway in turn converting to an 'alerting' and eventually a '200 OK' message from the proxy to the PSTN gateway to result in the 'connect' request being provided from the PSTN gateway. The client application can respond to the 'connect' request via 'connect-ack' response that provides a corresponding acknowledgment to the proxy 412. With the exchange of session information, corresponding audio can be connected between the proxy 412 and the client 408 to provide a corresponding cellular call leg between the mobile device and the PSTN gateway and another call leg between the PSTN gateway and the proxy 412. The proxy (e.g., a mobility controller) 412 in the private network can identify the mobile device 402 as an authenticated device based on a caller identifier provided in signaling (e.g., the invite request for the cellular call) from the PSTN gateway.

The proxy 412 can correlate (e.g., recognize) that the mobile device 402 that connected to the proxy via a cellular call is the same device that provided the teleconference information via the data channel. Such correlation can be used to enable the mobility controller of the proxy 412 to connect respective call legs together for joining the mobile device to the teleconference, such as disclosed herein.

Referring to FIG. 5B, the proxy 412 is also programmed to initiate a call to the conference bridge 406 based on the call-in detail provided by the mobile device 402. For example, the proxy can send an invite to the conference access number via the PBX 414. In other examples, the proxy can send the conference number to the conference access number via the PSTN gateway. In the example of FIG. 5, it is assumed that the proxy 412 places the call to the conference bridge using an IP protocol such as SIP. However, other protocols could be implemented to place such call. After establishing session parameters between the proxy 412 and the conference bridge 406, a corresponding call leg can exist between the proxy 412 and the conference bridge 406. The proxy 412 is programmed to fully join the teleconference by providing the corresponding credentials to the conference bridge 406, such as via DTMF codes on behalf of the mobile device 402. For example, the proxy 412 can provide a participant code and, if appropriate, a password via DTMF to the conference bridge. Following providing the credentials, the conference bridge 406 can log the proxy 412 into the identified teleconference event.

The proxy 412 can then perform signaling to connect the call leg between the proxy 412 and the conference bridge 406 with the call leg to the mobile device 402. For example, the proxy 412 can issue a 're-invite' request to the conference bridge which can respond via SDP with session parameters to enable bridging between the respective call legs. The proxy 412 can in turn provide the session parameters for bridging the call legs to the PSTN gateway. The PSTN gateway can in turn respond and connect the mobile device call leg at the PSTN gateway with the call leg connected to conference bridge based on specified session parameters, thereby connecting the mobile device with the teleconference via the PSTN gateway. As a result, the user of the mobile device can communicate with other parties that have connected to the respective teleconference event.

Figure 6:
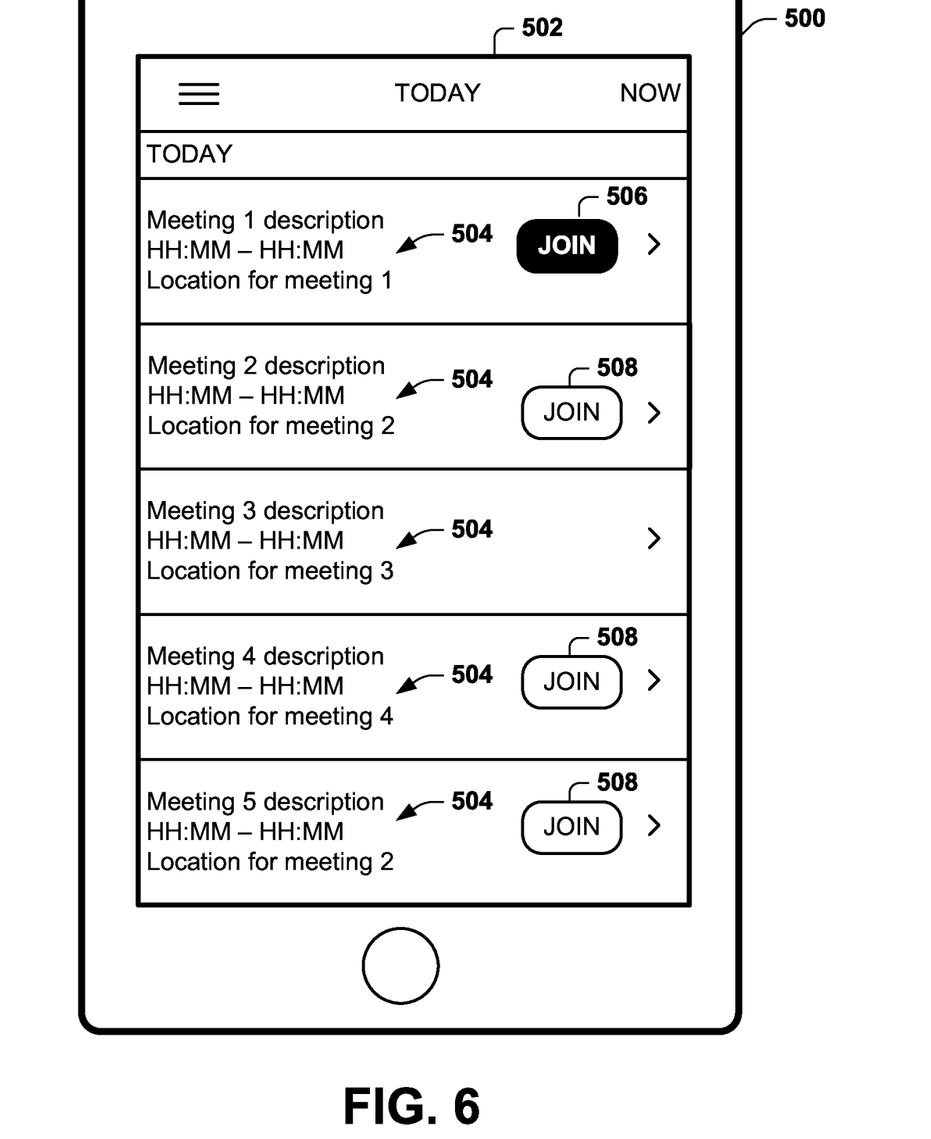
FIG. 6 is an example of a mobile device demonstrating a user interface to facilitate joining a teleconference from the mobile device.

By way of further example, FIG. 6 depicts an example of a mobile device 500 demonstrating a user interface 502 that can be utilized to facilitate joining a teleconference from the mobile device. The user interface 502 can be generated (e.g., by UI generator 114) based on calendar data that describes one or more scheduled teleconference events. The user interface thus can provide an ordered list of scheduled event entries 504 arranged in chronological order. For each of the calendar entries where a teleconference has been scheduled and detected (e.g., by teleconference detector 106), the event entries 504 can be populated with a join GUI element (e.g., a button) 506 and 508. For each other event entries 504 where a teleconference has not been scheduled (such as Meeting 3), the entry does not include the join GUI element. Additionally, the user interface 502 can be generated to graphically differentiate a meeting that is currently in progress or about to start from other scheduled teleconference events. For example, the join GUI element 506 is graphically differentiated from the other GUI elements 508, such as by shading, blinking or color coding it to indicate to the users which of the meetings they can immediately join in response to activating the join GUI element. The particular controls on whether a teleconference can be joined at any given time generally will be managed by the teleconference resource in which a given event has been scheduled.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. One or more non-transitory computer-readable media having instructions executable by a processing resource in a mobile device, the instructions being programmed to perform a method comprising:
   in response to an activation user input at the mobile device, the activation user input associated with a teleconference event, automatically joining the mobile device to the teleconference event by:
      retrieving from a memory of the mobile device stored call-in details for the teleconference event, wherein the stored call-in details are determined based on parsed calendar data associated with at least one user account;
      selecting a call path from a plurality of call paths for connecting the mobile device to the teleconference event, the selecting comprising:
         evaluating mobile device data and operating conditions for the mobile device; and
         based on the evaluation, determining whether to initiate a call leg from the mobile device to the remote proxy via a first call path comprising a voice channel over a data network or to initiate the call leg to the remote proxy via a second call path comprising a cellular voice network;
      based on both the selected call path and on the retrieved call-in details, generating a teleconference message in a predefined message format, the teleconference message encoding the call-in details including credentials to access the teleconference event via the selected call path;
      sending, from the mobile device to a remote proxy via the selected call path, the teleconference message; and
      connecting the mobile device to the teleconference event via the selected call path, the selected call path being established in response to sending the teleconference message.

2. The one or more media of claim 1, wherein, based on determining to initiate the call leg via the first call path, the teleconference message is sent from the mobile device to the remote proxy via a data channel between the mobile device and the remote proxy as part of a SIP INVITE request sent to the proxy device via a SIP protocol.

3. The one or more media of claim 1, wherein parsing the calendar data further comprises periodically parsing or parsing in response to an event being added to a calendar for the at least one user account, the mobile device being registered to access and read calendar data for the at least one user account.

4. The one or more media of claim 1, wherein, based on determining to initiate the call leg via the second call path, the teleconference message encodes at least a conference access telephone number and one or both of an access code and password, and wherein sending the teleconference message comprises initiating a cellular voice call from the mobile device with the remote proxy via the second call path.

5. The one or more media of claim 1, wherein the teleconference message further encodes a separate host identifier to enable a user of the mobile device with additional teleconference functionality during the teleconference.

6. The one or more media of claim 1, wherein connecting the mobile device to the teleconference event further comprises:
calling a predetermined access number for the remote proxy via a public gateway to establish a portion of the call path that includes a first call leg between the mobile device and the remote proxy, another access number for the teleconference event being called to establish another portion of the call path that includes a second call leg between the remote proxy and the teleconference event, the first call leg being connected with the second call leg to connect the mobile device to the teleconference event.

7. The one or more media of claim 1, wherein the connecting the mobile device to the teleconference event further comprises:
sending a request from the mobile device to connect to the remote proxy via a data channel to establish a portion of the call path that includes a first call leg between the mobile device and the remote proxy, another access number for the teleconference event being called, based on the call-in details, to establish another portion of the call path that includes a second call leg between the remote proxy and the teleconference event, the first call leg being bridged with the second call leg to connect the mobile device to the teleconference event.

8. The one or more media of claim 1, wherein the call-in details comprise an access telephone number for calling a teleconference service and at least one of an access code and a password.

9. The one or more media of claim 1, wherein the method further comprises:
generating an interactive list of calendar entries, including a calendar entry for the teleconference event, the calendar entry for the teleconference event including an interactive graphical user interface element configured to trigger the automatically joining of the teleconference event in response to the user input activating the interactive graphical user interface element.

10. The one or more media of claim 9, wherein the interactive graphical user interface element comprises a feature that is set to indicate at least one of a predetermined temporal proximity to a start time or an in-progress state for the teleconference event.

11. The one or more media of claim 1, wherein the call-in details further comprise current operating parameter data for the mobile device, the teleconference event being established for the mobile device using at least one selected type of communication capability that is determined based on the current operating parameter data for the mobile device.

12. A mobile device, comprising:
memory that includes the one or more computer-readable media of claim 1; and
a processor to execute the method and to trigger the joining of the teleconference event in response to the user input.

13. A system comprising:
a mobile device configured to generate and send a teleconference message including teleconference information for a given teleconference event over a call path selected from a plurality of different call paths to a remote proxy in response to a user input at the mobile device to join the given teleconference event, the teleconference information including call-in details sufficient to enable the remote proxy to connect to a teleconference resource for the given teleconference event, the call-in details determined based on parsed calendar data associated with at least one user account, the call paths comprising a voice channel over a data network and a cellular voice network, the selection of the call path being based on policies and mobile data, the content of the teleconference message being based on both the selected call path and the teleconference information, the mobile device connecting to the remote proxy to establish a call leg between the mobile device and the remote proxy; and
the remote proxy being configured to establish a call leg between the remote proxy and the teleconference resource in response to the teleconference information, the remote proxy configured to join the mobile device into the given teleconference event of the teleconference resource by bridging the call leg between the mobile device and the remote proxy with the call leg between the remote proxy and the teleconference resource.

14. The system of claim 13, wherein, based on the selected call path being the voice channel over the data network, the mobile device is configured to provide the teleconference information to the remote proxy via a data channel as part of a SIP INVITE request sent to the proxy device via a SIP protocol.

15. The system of claim 13, wherein mobile data specifies at least one of the availability of a wireless network, current signal strength of the mobile device, location of the mobile device, and movement of the mobile device.

16. The system of claim 13, wherein the mobile device comprises a path selector and a plurality of wireless interfaces that provide the plurality of different call paths, the path selector being programmed to:
evaluate mobile device data and operating conditions for the mobile device; and
select which of the plurality of wireless interfaces and respective call paths to use for connecting to the remote proxy.

17. The system of claim 16, wherein the call leg between the mobile device and the remote proxy is a first call leg,
wherein in response to the path selector selecting the cellular voice network as the selected call path, the mobile device being configured to call a predetermined access telephone number assigned to the remote proxy via a public gateway to establish a portion of the call path that includes the first call leg between the mobile device and the remote proxy, and
wherein the remote proxy is configured to bridge another call leg between the remote proxy and the given teleconference event with the first call leg to connect the mobile device to the given teleconference event.

18. The system of claim 16, wherein the call leg between the mobile device and the remote proxy is a first call leg,
wherein in response to the path selector selecting the voice channel over the data network as the selected call path, the mobile device being configured to connect to the remote proxy via an authenticated data channel to establish the first call leg between the mobile device and the remote proxy, and
wherein the remote proxy is configured to bridge the first call leg with another call leg between the remote proxy and the teleconference resource to connect the mobile device to the given teleconference event.

19. The system of claim 13, wherein the mobile device further comprises:
a teleconference detector programmed to parse calendar data associated with at least one user account to generate the teleconference information for the given teleconference event; and
a user interface generator programmed to generate a join user interface associated with the given teleconference event, the join user interface programmed to invoke a join process for the given teleconference event in response to the user input.

20. The system of claim 13, wherein the teleconference information comprises an access telephone number for calling the teleconference resource and at least one of an access code and a password.

21. The system of claim 13, wherein the call-in details further comprise current operating parameter data for the mobile device, and
wherein the remote proxy is configured to specify a selected type of communication capability for the mobile device for the given teleconference event based on the current operating parameter data the mobile device.

22. A method comprising:
in response to a user input at a mobile device activating a user interface associated with a given teleconference event, establishing a first call leg between the mobile device and a proxy device that is remote with respect to the mobile device by:
determining, based on mobile device data and operating conditions for the mobile device, whether to initiate the first call leg via a first call path comprising a voice channel over a data network or to initiate the first call leg via a second call path comprising a cellular voice network;
generating a teleconference message in a predefined message format, the teleconference message encoding call-in details including credentials required to access the teleconference event, the message format based on the determined call path, the call-in details determined based on parsed calendar data associated with at least one user account;
sending the teleconference message from the mobile device to the proxy device over the selected call path;
establishing a second call leg between the proxy device and a predefined teleconference resource based on the call-in details for the given teleconference event provided from the mobile device to the proxy device via a data channel in the absence of another user input; and
bridging the communications path between the mobile device and the proxy device with the communications path between the proxy device and the predefined teleconference resource to enable the mobile device to join the given teleconference event.

* * * * *